July 16, 1963

R. HEUZÉ

3,097,985

TIRE BUILDING DRUM

Filed June 24, 1960

United States Patent Office 3,097,985
Patented July 16, 1963

3,097,985
TIRE BUILDING DRUM
René Heuzé, Saint Ouen, France, assignor to Pneumatiques et Caoutchouc Manufacture Kleber-Colombes, Paris, France, a corporation of France
Filed June 24, 1960, Ser. No. 38,531
Claims priority, application France June 30, 1959
5 Claims. (Cl. 156—416)

This invention relates to drums used in the manufacture of vehicle tires and, more particularly, to tire building drums of the type employing an annular membrane extending between a coaxial pair of circular side members or flanges which are mounted for relative movement toward and away from each other.

The construction of inflatable vehicle tires is now generally effected by assembling the components thereof in annular band configuration upon a generally cylindrical drum with the annular band shaped to the characteristic toroidal configuration either before or after the tread rubber is applied. The shaping of the green or uncured tire may be effected in a separate operation and by separate apparatus from that employed in the assembling of the components of the tire. However, it is frequently desirable to employ the drum on which the tire is assembled to also effect the shaping especially when the shaping to the toroidal configuration is to occur before the application of the tread rubber.

Attempts have been made heretofore to make drums which provide both a cylindrical supporting surface during construction of the tire and subsequent toroidal shaping of the latter. These prior drums generally comprise an impervious flexible annular membrane which extends between and is anchored to side flanges that are adapted to be moved axially relative to each other with some provision for introducing fluid pressure to the region between the flanges and membrane. Drums of this type are intended to be employed with the side members or flanges spaced apart and the annular membrane substantially cylindrical while the tire carcass is being assembled with the tire shaping occurring during the second stage of manufacture through application of fluid pressure to the interior of the drum and the axial movement of the side members.

In prior tire building and shaping drums of the type mentioned above, difficulties have been encountered when the membrane has been made sufficiently extensible to readily provide the desired shaping upon inflation, since such a diaphragm then lacks sufficient rigidity to provide the requisite cylindrical form during assembly of the tire carcass. In attempts to alleviate this lack of rigdity efforts have been made to employ compressed air in the interior of the drum while it is in its cylindrical condition. This involves a number of complications in the construction of the controls which add to the expense thereof and, unfortunately, these expedients have not satisfactorily solved the problem of the lack of rigidity.

When the annular membranes for tire drums of the expansible type are provided with transversely extending inextensible reinforcing members, the difficulties aforementioned with respect to lack of rigidity in the cylindrical shape of the membrane are greatly lessened but the toroidal configuration of the membrane is, of necessity, invariable in dimensions so that the reinforcing cords of the tire may not be placed under proper tension during shaping of the carcass and the deformation of the carcass is, therefore, not uniform or complete.

The principal object of this invention is, therefore, to provide a tire building drum of the type comprising an annular membrane supported upon axially movable side members wherein the membrane has a construction such that the configuration of the outer surface may be varied as the side members and membrane are moved to provide the generally toroidal configuration.

Another object of the invention is to provide a tire building drum of the type defined in the preceding paragraph wherein the outer surface of the membrane comprising the tire carcass supporting surface has portions which are generally radially outwardly extensible relative to the main body of the membrane.

A further object of the invention is to provide an improved annular membrane for an inflatable tire building drum wherein the membrane is provided with transversely extending inextensible reinforcing members preventing change in dimensions of the main body of the membrane and the outer surface of the latter is provided with extensible portions comprising the outer walls of the chambers to which inflation pressure may be provided to extend the said walls relative to the main portion of the membrane.

A more specific object of the invention is to provide an improved annular membrane for a tire building drum as defined in the preceding paragraph wherein the outer walls for the chambers provided in the membrane may be disposed in folded condition when the membrane is in substantially cylindrical configuration with the said walls unfolded and extended when fluid pressure is applied to the chambers in the membrane.

Further objects and advantages of the invention will be apparent from the following description of the presently preferred embodiment of the invention, and certain modifications thereof, described with reference to the accompanying drawings, forming a part of this application, and in which.

Machines for building inflatable tires from a plurality of layers of material arranged upon inflatable drums in an annular configuration and then shaped to a generally toroidal configuration are now known in the art and hence details of the means by which such drums are supported and rotated are not here illustrated and described. It is sufficient to note that such equipment generally comprises disk-like side members mounted upon a shaft rotation therewith and relative axial movement therealong with a flexible annular member extending between the side members and cooperating therewith to form a chamber to which an inflation producing fluid, such as compressed air, may be applied.

Figure 1:
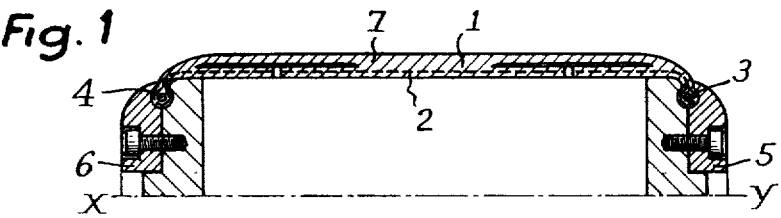
FIG. 1 is a fragmentary transverse sectional view, taken on an axial plane, of the presently preferred embodiment of a tire building drum incorporating the principles of this invention with the drum shown in its generally cylindrical configuration.
Figure 2:
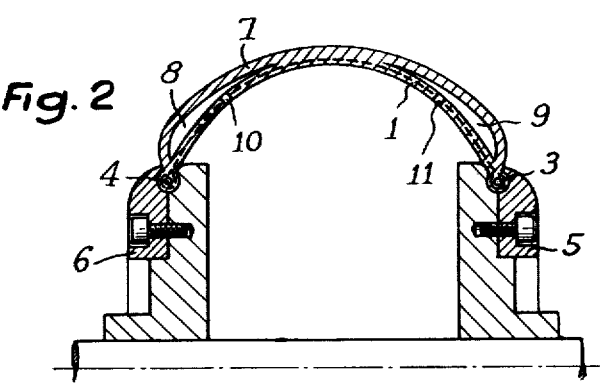
FIG. 2 is a view taken as in FIG. 1 but to a somewhat smaller scale and with the drum shown in its toroidal configuration with fluid pressure applied thereto.

In accordance with this invention, the annular member for a tire building machine of the expansible drum type is a membrane 1 which, as shown in FIGS. 1 and 2 of the drawings, comprises elastomeric material, such as rubber, reinforced by inextensible elements 2, that may be wire strands or cables. These reinforcing elements 2 extend generally axially of the membrane and have their ends turned about bead cores 3 and 4 with the edges of the membrane containing the bead cores suitably anchored to the peripheries of the side members or flanges 5 and 6 of the drum to provide a tight seal. As here shown, this is accomplished by providing each of the flanges 5 and 6 in two-piece construction adjacent its periphery with complementary annular recesses in each of the two parts which recesses receive the beads or edges of the annular membrane and retain the latter therein. The two parts of each side member or flange are held together by suitable clamping means which may be screws, as shown, or other known means.

The outer surface 7 of the membrane 1 is formed of elastomeric material, such as rubber, which is firmly bonded to the main body of the diaphragm in three annular areas, namely, in the middle region and at either edge, thereby defining two annular chambers or pockets 8 and 9 which extend circumferentially of the membrane. These pockets or chambers communicate with the interior of the drum through ports or openings 10 and 11 provided in the interior walls of the chambers or pockets.

The construction is such that when the side members or flanges 5 and 6 are in their axially spaced condition, as shown in FIG. 1, the membrane 1 is generally cylindrical and provides a support upon which a tire carcass may be built in annular band configuration. The inextensible reinforcing elements 2 provide rigidity preventing undesirable radially inward deflection of the membrane during this operation. When it is desired to shape the tire carcass to its toroidal configuration, the side members or flanges 5 and 6 are moved axially relative to each other to a position as indicated in FIG. 2 and fluid pressure, such as compressed air, is delivered into the interior of the drum. This movement of the flanges and introduction of fluid pressure causes the membrane to take up the toroidal configuration shown in FIG. 2 with the outer diameter of the drum being independent of the pressure of the inflating fluid due to the presence of the inextensible reinforcing elements 2. Hence, the outer diameter of the drum in the central region depends only on the axial length of the membrane and the final spacing of the flanges or side members.

The fluid under pressure supplied to the interior of the drum also flows through the ports 10 and 11 and into the pockets or chambers 8 and 9 thus causing deformation of the outer walls of these chambers, as indicated in FIG. 2, thereby suitably shaping the tire carcass and causing the desired application of tension to the reinforcing elements thereof so that the tire carcass is given the appropriate shape which is determined, in part, by the size of the chambers 8 and 9 and, in part, by the amount of fluid pressure applied to the interior of the drum. The outer walls of the chambers 8 and 9 may be formed solely of elastomeric material or may include reinforcing material to limit the extent of extensibility in response to the application of fluid pressure to the chambers.

Figure 3:
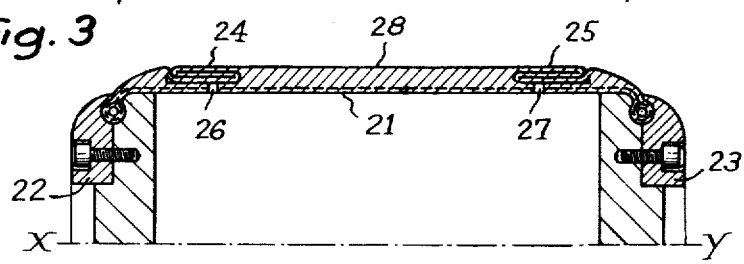
FIG. 3 is a view similar to FIG. 1 but showing a modification of the annular membrane of the drum.
Figure 4:
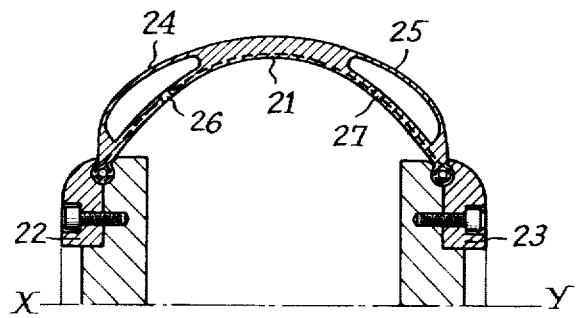
FIG. 4 is a view similar to FIG. 2 showing the drum of FIG. 3 in its toroidal configuration and with fluid pressure applied thereto.

FIGS. 3 and 4 illustrate a modified construction of a tire building drum embodying the principles of this invention. This drum comprises a membrane 21 formed of elastomeric material and generally axially extending reinforcing elements turned about the bead cores and secured in sealing relationship to the periphery of the side members or flanges 22 and 23 in a manner similar to the construction shown in FIGS. 1 and 2. The membrane 21 shown in FIGS. 3 and 4 differs from that in FIGS. 1 and 2, however, in that the outer walls for the circumferentially extending pockets or chambers 24 and 25, provided on either side of the central portion of the membrane, have a greater transverse dimension than the inner walls thereof. Hence, these outer walls assume a folded condition when deflated and collapsed, as indicated in FIG. 3. The pockets or chambers 24 and 25, like the chambers 8 and 9 of the previous embodiment, communicate with the interior of the drum through suitable ports which are indicated in the drawings at 26 and 27. Preferably, the thickness of the elastomeric covering 28 on the outer surface of the drum is sufficiently great in the central region of the membrane to provide a substantially smooth outer surface with the outer walls of the pockets or chambers when the latter are in their deflated condition as shown in FIG. 3.

The outer walls of the chambers 24 and 25 may be provided, if desired, with suitable reinforcing elements, such as cords or the like, to limit the extent of their extension in response to the introduction of fluid pressure therein. This reinforcement may be such as to substantially prevent any stretching of the outer walls or may be such as to provide for limited stretching thereof.

It will be apparent that the invention is not limited to the constructions specifically shown and described but that variations may be made without departing from the principles of the invention. By way of example but without limitation thereto, it may be mentioned that it is possible to provide communication to the side pockets or chambers of the membrane through external tubes so that extension of the outer walls of these chambers may be independent of the shaping of the membrane to its toroidal configuration. This may be desirable, for example, if it should be advantageous to employ a different internal fluid pressure within the drum than that in the chambers in the membrane. It will also be apparent that the chambers or pockets in the membrane can be formed externally on the membrane rather than integrally therein as has been shown and described. These and other modifications of the invention, which will readily occur to those skilled in the art, are deemed as encompassed within the ambit of the invention, the scope of which is defined in the appended claims.

Having thus described the invention, what is claimed is:

1. A tire building drum comprising a pair of fluid impervious side members at least one of which is axially movable relative to the other, an annular membrane of flexible impervious material reinforced by flexible inextensible elements extending generally axially of the membrane, and means for clamping the edges of said membrane in sealing relationship with the peripheries of said side members so that introduction of fluid under pressure into the region between said side members and membrane shapes the latter to a transversely arcuate configuration, the said membrane including an integral cover of elastomeric material radially outwardly of said reinforcing elements with separate circumferentially extending inflation chambers between said cover and the said inextensible elements on either side of the circumferential center line of the members, a wall of each of said chambers being provided with an opening for the introduction therein of fluid under pressure to thereby effect movement of the portions of said cover over said chambers outwardly relative to the reinforcing elements.

2. A tire building drum comprising a pair of fluid impervious side members at least one of which is axially movable relative to the other, an annular membrane of flexible impervious material reinforced by flexible inextensible elements extending generally axially of the membrane, and means clamping the edges of said membrane in sealing relationship with the peripheries of said side members, the said membrane including an outer cover of elastomeric material the central portion and edges of which are integrally united with the underlying portions of the membrane while the portions of the cover intermediate the said central portion and edges are not adhered to the underlying portions of the membrane thereby providing a pair of circumferentially extending chambers each of which is provided with a port communicating with the region between said side members and membrane, whereby fluid under pressure applied interiorly of the membrane shapes the latter to a generally toroidal configuration and effects movement of the portions of said cover over said chambers outwardly relative to the adjacent outer surface of the membrane.

3. A tire building drum comprising a pair of fluid impervious side members at least one of which is axially movable relative to the other, an annular membrane of flexible impervious material reinforced by flexible inextensible elements extending generally axially of the membrane, and means clamping the edges of said membrane in sealing relationship with the peripheries of said side members so that introduction of fluid under pressure into the region between said side members and membrane shapes the latter to a transversely arcuate configuration, the said membrane including an outer cover of elastomeric material having a pair of spaced circumferentially extending recesses radially outwardly of said inextensible elements on either side of the circumferential center line of the membrane over which recesses continuous integral portions of the cover extend thereby forming inflation chambers each having a fluid passage communicating with the region between said side members and membrane, the lateral extent of said portions of the cover over the recesses being greater than the lateral extent of the recesses so that the said cover portions extend outwardly beyond the adjacent surfaces of the membrane when fluid under pressure is introduced into said drum and chambers, the said cover portions being foldable into said recesses when the said chambers do not contain fluid under pressure.

4. A tire building drum comprising a pair of fluid-impervious side members at least one of which is axially movable relative to the other, an annular membrane of flexible impervious material reinforced by flexible inextensible elements extending generally axially of the membrane, and means clamping the edges of said membrane in sealing relationship with the peripheries of said side members so that introduction of fluid under pressure into the region between said side members and membrane shapes the latter to a transversely arcuate configuration, the said membrane having a pair of circumferentially extending fluid pressure receiving chambers on either side of the circumferential center line of the membrane radially outwardly of the said inextensible elements, the said chambers each having a port for passage of fluid under pressure and an outer wall movable outwardly relative to the adjacent outer surface of the membrane when fluid under pressure is introduced through said port into the chamber.

5. A tire building drum as defined in claim 4 wherein the said outer walls of said chambers have transverse dimensions which are greater than the transverse dimensions of said chambers with the said outer walls being foldable into the said chambers when said chambers are not subject to fluid pressure.

References Cited in the file of this patent
UNITED STATES PATENTS

| | | |
|---|---|---|
| 1,789,143 | Kraft | Jan. 13, 1931 |
| 2,084,009 | Sohl | June 15, 1937 |
| 2,717,628 | Wikle | Sept. 13, 1955 |
| 2,763,317 | Ostling | Sept. 18, 1956 |
| 2,814,330 | Vanzo | Nov. 26, 1957 |
| 2,935,117 | Pfeiffer | May 3, 1960 |

FOREIGN PATENTS

| | | |
|---|---|---|
| 606,411 | Great Britain | Aug. 12, 1948 |

UNITED STATES PATENT OFFICE
CERTIFICATE OF CORRECTION

Patent No. 3,097,985                                      July 16, 1963

René Heuzé

It is hereby certified that error appears in the above numbered patent requiring correction and that the said Letters Patent should read as corrected below.

Column 2, line 53, after "shaft" insert -- for --; column 4, line 43, for "members" read -- membrane --.

Signed and sealed this 11th day of February 1964.

(SEAL)
Attest:

ERNEST W. SWIDER
Attesting Officer

EDWIN L. REYNOLDS

Acting Commissioner of Patents